May 16, 1961  R. M. FORD ET AL  2,984,179
DUPLICATING MACHINES
Original Filed March 22, 1955

INVENTORS:
Ronald Max Ford
Denis Percy Crane

BY
Richardson, David and Verdon
ATTORNEYS.

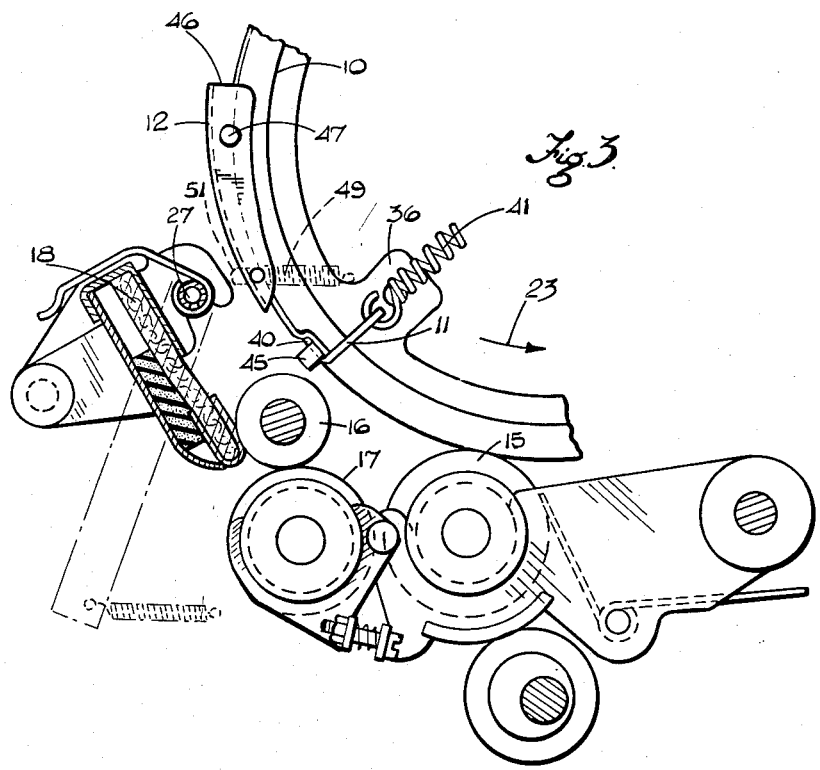
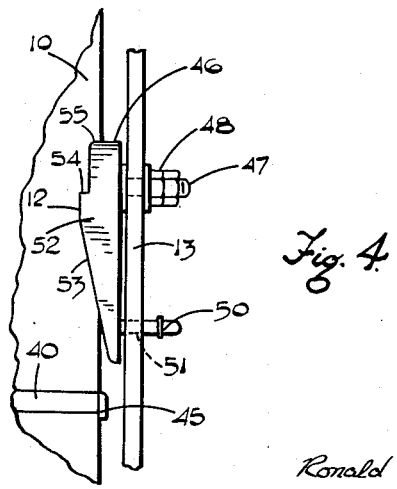

United States Patent Office 2,984,179
Patented May 16, 1961

2,984,179

DUPLICATING MACHINES

Ronald Max Ford and Denis Percy Crane, Olton, England, assignors to Frank R. Ford Limited, Birmingham, England, a British company Original application Mar. 22, 1955, Ser. No. 496,027. Divided and this application Sept. 26, 1957, Ser. No. 686,314

4 Claims. (Cl. 101—415.1)

The present invention relates to duplicating machines (hereinafter referred to as being of the kind specified), having a rotary printing couple comprising a master cylinder and a pressure roller in between which copy sheets can be placed, the master cylinder having clamping means for a master sheet bearing the matter to be reproduced, so that the master sheet overlies the circumferential face of the master cylinder.

The master sheet may be of the kind bearing in reverse or mirror image the matter to be reproduced, such matter being applied to the master sheet hectographic carbon which when brought into pressure contact with a suitable moistened copy sheet, leaves an adherent impression thereon.

One object of the present invention, is to provide a new or improved form of clamping member for the master sheet and means for moving same between a sheet clamping and a sheet releasing position, which means are simple and reliable in operation, and can be manufactured without incurring high cost.

A further object of the invention is to provide a simple and inexpensive construction for the clamping member itself.

Yet another object of the invention is to provide an improved form of actuating means for moving the clamping member to its sheet releasing position by operation of the master cylinder in a direction reversely of the normal operation direction of rotation.

A preferred embodiment of a duplicating machine of the kind specified embodying the various improvements in accordance with the invention will now be described by way of example with reference to the accompanying drawings wherein:

Figure 3 is a fragmentary view in side elevation and on an enlarged scale and partly in cross section corresponding to a part of Figure 1 and additionally showing the actuating means for the clamping member.

Figure 4 is a fragmentary plan view to the same scale as Figure 3 showing the actuating means for the clamping member of the master cylinder.

Figure 1:
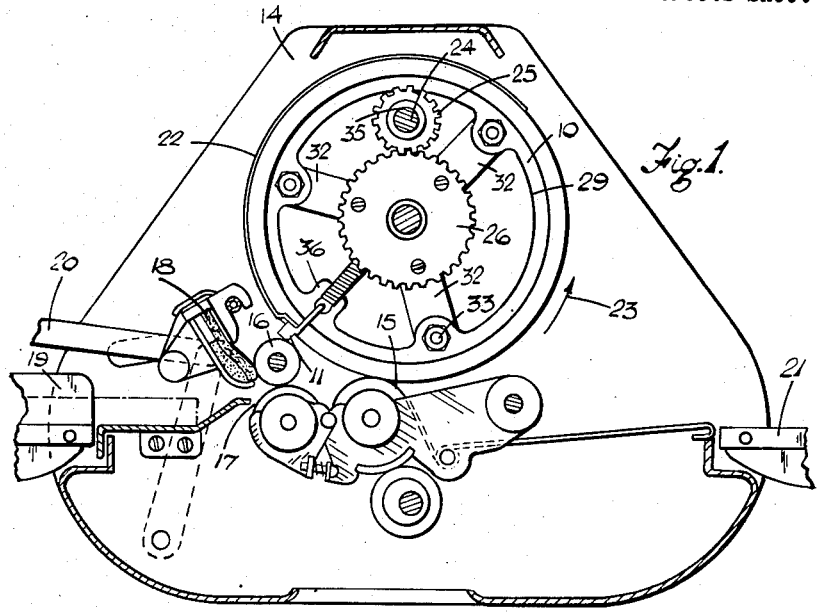
Figure 1 is an elevation of one construction of duplicating machine of the kind specified in accordance with our invention, one of the side frame members of the machine being removed and parts being shown in section and other parts being broken away.

In the construction illustrated the machine comprises the following main components or assemblies: a master cylinder 10 with which is assembled a master sheet clamping member 11; actuating means 12 for the clamping member; side frames 13 and 14 between which the master cylinder is journalled for rotation about a horizontal axis; a pressure roller 15 co-operating with the master cylinder 10 to form a printing couple therewith; a moistening means including a moistening roller 16 and moistening pressure roller 17 and pad means 18 applying liquid to the moistening roller 16; a part of a feed table 19 is also illustrated as is a reciprocable bar 20 for a sheet feeding device which is not shown; and a part of a sheet receiving tray 21 is also illustrated.

A duplicating machine similar to this machine is fully described and illustrated in our co-pending patent application No. 496,027 dated March 22, 1955, now abandoned, the present application being a divisional application of our aforesaid application. The present invention is particularly concerned with the clamping member for the master sheet and means for moving same between a sheet clamp and a sheet release position, and in the following description parts relevant to this invention will alone be described in detail.

Briefly, however, the working of the machine is as follows. The master cylinder 10 has clamped thereto by means of the clamping member 11 a master 22 and the master cylinder is caused to rotate in the direction of the arrow 23 by manual or power means, not shown, the rotation being transmitted from the shaft 24 through the intermediary of gear wheels 25 and 26. A suitable solvent is supplied by way of a tube 27 to the pad means 18. The moistening roller 16 is moistened by contact with this pad means and the upper surface of a sheet of paper passing between the rollers 16 and 17 may thus be moistened. The roller 16 is rotated intermittently by means not shown and the roller 17 is rotated by frictional contact with the roller 16 or with the sheet of paper passing between these rollers. The roller 15 is rotated by frictional contact with the master cylinder. Sheets of paper are fed successively from the feed table 19 to the rollers 16 and 17 by any suitable sheet feeding device, not shown, actuated by the reciprocable rod 20 which is caused to reciprocate by means not shown in synchronism with the rotation of the master cylinder 10.

The sheet of paper is fed from the rollers 16 and 17 to the printing couple formed between master cylinder 10 and roller 15 and on passage through the printing couple material applied to the master sheet in hectographic carbon is in part transferred to the sheet of paper. The paper then passes from the printing couple to the sheet receiving tray 21.

Figure 2:
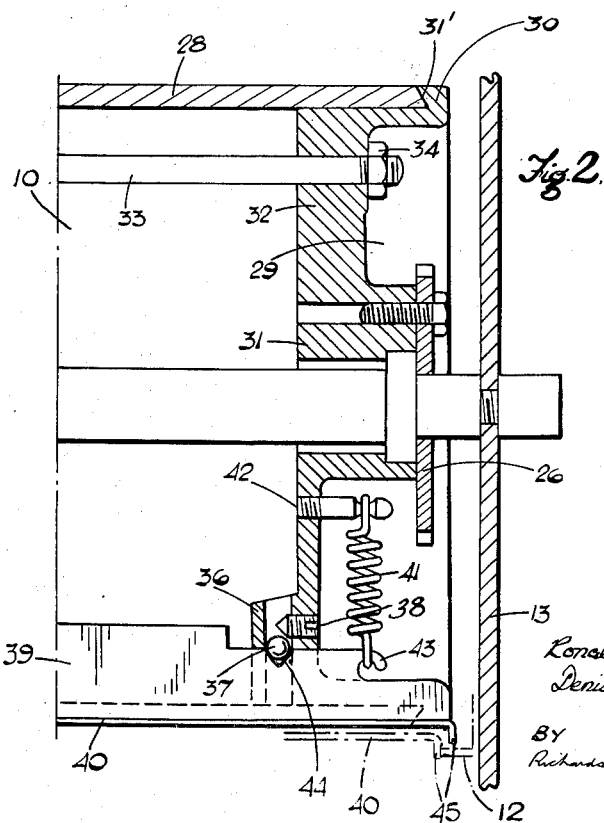
Figure 2 is a fragmentary plan view of the master cylinder and clamping member assembly taken on a diameter and shown on an enlarged scale.

Referring now in greater detail to the master cylinder and clamp member assembly the master cylinder has a body comprising a cylindrical shell 28 (Figure 2) of substantially uniform wall thickness, and which conveniently may be formed by cutting off a length from extruded aluminum or other suitable metal stock.

To accommodate the clamping member this shell has a slot cut therein extending through the thickness of the shell, this slot being of relatively narrow width such for example, as to receive as a sliding fit a thickness of said metal of say 18 S.W.G.

Assembled with the shell 28 are a pair of hub members 29 disposed at or near opposite ends of the shell and formed with rim elements 30 presenting inwardly directed axial faces 31' which are all of under cut form to co-operate with bevelled end faces of the shell 28 and retain or constrain the shell to be maintained in accurately cylindrical shape, notwithstanding the existence of the slot therein which extends from end to end of the shell.

The rim elements 30 of the hub members 29 may be connected to a central boss 31 of each hub element by spokes 32 which are apertured to receive the ends of tie-rods 33 on which are threaded nuts 34 serving to clamp the hub members against the end faces of the shell 28. The central boss 31 may in the case of one hub member have secured thereto a driving gear 26 with which meshes a pinion 25 fixed on a spindle 35 with which a handle (not shown) is releasably clutched so as to permit of removal of the handle and storage inside the casing of the machine when it is required to be transported from place to place or is otherwise out of use. Alternatively the spindle 35 may be motor driven.

At a position in register with the slot in the shell 28 each of the rim elements 30 of the hub member is formed with an integral inward projection or block 36, of which the outer portion is slotted in correspondence with the slot in the shell 28 and which has a radially extending bore so as to form a recess in which is accommodated a bearer element conveniently in the form of a hardened steel ball 37 which is retained against inward displacement by a grub screw 38.

Referring now specifically to the clamping member this may advantageously be formed as a sheet metal pressing and is itself of elongated strip-like form having a flat plane guiding portion 39 which enters into the slots of the shell and hub members engaging with the walls of these slots as an easy sliding fit and capable of sliding movement both depthwise of the slot and axially thereof.

At its outer edge this strip has a flange 40 which is bent at right angles to overlie a marginal portion of the circumferential face of the shell bordering on the slot.

It will be understood that the plane in which the guiding portion of the clamping members lie may be truly radial with respect to the axis of the master cylinder, or it may be inclined as desired to this truly radial plane.

The width of the flange or overlying portion 40 of the clamping member may conveniently be about one-quarter of the depth of the guiding portion 39, appropriate dimensions being $3/16$ of an inch for the flange and $3/4$ of an inch for the depth of the guiding portion, the clamping member as a whole being formed preferably from stainless steel of 18 S.W.G.

The marginal portion of the shell which lies beneath the flange 40 is preferably recessed as seen particularly in Figure 3 so as to accommodate the thickness of the flange and the leading margin of the master sheet, which in operation of the machine will be clamped between the underside of the flange and the bottom face of this recessed portion.

The clamping member is held in its operative clamping position by biasing means in the form of coiled tension springs 41 disposed one at each end of the clamping member and anchored at their inner ends to studs 42 carried by the hub members and engaging with the clamping member at their outer ends by means of hook formations 43 on the guiding portion of the clamping member situated conveniently adjacent to the outer face of each hub member so as to be accessible.

To move the clamping member to its releasing position in which it is expelled and moved outwardly to some extent from the slots cam means are provided comprising cam faces of V-shaped form as indicated at 44 with which co-operate the bearer elements 37. Conveniently the cam faces are formed by a portion of the inner edge of the clamping member and are thus presented inwardly of the slot, but it will be understood that the cam faces might be provided on a part of the master cylinder and the bearer elements formed or carried on the clamping member.

The V-shaped form of the cam faces 44 results in outward expulsion of the clamping member in response to axial displacement thereof and also provides for axial location of the clamping member when in its clamping position.

In the construction illustrated the clamping member is arranged to be displaced axially by means of an integral operating element formed as an extension of the flange 40 which is bent or cranked radially outwards as indicated at 45.

To engage with the part 45 we provide actuating means comprising a thrust member 46 (Figure 4) which may be formed as a sheet metal pressing and which comprises a plate portion pivotally connected about an axis parallel to that of the master cylinder or substantially so to the side frame member 13 by means of a stud 47 having a nut and lock nut as indicated at 48. This member 46 is biased by a coiled tension spring 49 radially inwards, movement being limited by a pin 50 operating in a slot 51 in the side frame member.

At its outer edge the plate portion of the thrust member 46 has a flange or rib 52 which lies approximately tangentially or circumferentially with respect to the circular path traced out by the part 45 during rotation of the master cylinder, the inner face of the flange or rib 52 being disposed to intersect with this path in a manner such that the part of the face nearest the stud 47 lies outside the path, whilst the trailing part of the face remote from the stud 47 lies inside the path.

Thus this face constitutes a trip face which is engaged by the outwardly radially directed edge or extremity of the part 45 when the master cylinder is rotated in the direction of the arrow 23 (Figure 3) and the thrust member is deflected pivotally so that it is not active to effect an axial displacement of the clamping member.

The inner axially presented edge of the flange or rib 52 is formed as a thrust face 53 which is inclined with respect to a plane perpendicular to the axis of the master cylinder in a direction such as to be engaged by the outwardly axially presented face of the part 45 during rotation of the master cylinder in a direction reversely of the arrow 23, thereby displacing the clamping member axially relatively to the master cylinder.

At a position intermediate its ends the thrust face 53 is provided with a latching formation comprising a shoulder or abutment 54 beyond which the thrust face is continued in a plane perpendicular to the axis of the master cylinder, as indicated at 55.

The user of the machine can thus bring the master cylinder to rest in a predetermined position with the clamping member disposed at the front of the machine by executing reversed rotation of the master cylinder until the part 45 passes beyond the shoulder 54 and then ceasing the reversed rotation of performing a small increment of forward rotation to seat the part 45 against the shoulder. By these means the clamping member may be held in its releasing position.

It will be apparent from the foregoing that in contrast with constructions of clamping member and master cylinder hitherto ordinarily adopted a considerable simplification has been effected both in the construction of the clamping member itself in the master cylinder, more particularly in the latter case by the elimination from the interior of the master cylinder shell of the usual integral inward projection which is recessed or slotted to accommodate the clamping member. The simple construction of the clamping member and its actuating means further contributes to the relatively low cost of manufacture and reliability of operation over an extended period of service.

What we claim then is:

1. In a duplicating machine of the kind specified, a master cylinder comprising a cylindrical shell and structurally separate end plates assembled therewith, the shell having an axially extending slot, and the end plates having housings containing balls disposed radially inwardly of the slot, a master sheet clamping member, of elongated form, mounted as an axially and depthwise sliding fit in said slot, between sheet clamping and sheet releasing positions and having a portion of its outer edge overlying a recessed marginal portion of the circumferential face of the master cylinder bordering the slot, biasing means urging the clamping member inwardly of the slot towards the clamping position, means for expelling the clamping member towards its releasing position against the action of said biasing means comprising axially spaced inwardly presented V-shaped cam faces on the clamping member engaging the balls, to locate the clamping member in the clamping position and active to effect expulsion in response to axial displacement of the clamping member, and means for effecting such axial displacement of the clamping member.

2. In a duplicating machine of the kind specified, a master cylinder comprising a cylindrical shell having an axially extending slot, and structurally separate end plates assembled with said shell, a master sheet clamping member slidable axially and depthwise of said slot and having a portion overlying a marginal portion of said shell bordering on said slot, biasing means urging said clamping member inwardly of said slot towards a clamping position, and means for expelling said clamping member outwardly of said shell in response to axial displacement of said clamping member comprising cam elements and cooperative bearer elements at each end of said master cylinder, one of said elements at each end being carried by the end plate at said end and the other of said elements being carried by said clamping member.

3. In a duplicating machine of the kind specified a master cylinder comprising a cylindrical shell having an axially extending slot, and structurally separate end plates assembled with said shell said end plates incorporating housings, a master sheet clamping member slidable axially and depthwise of said slot and having a portion overlying a marginal portion of said shell bordering on said slot, biasing means connected between said end plates and said clamping member urging said clamping member inwardly of said slot towards a clamping position, and means for expelling said clamping member outwardly of said shell in response to axial displacement of said clamping member comprising cam elements and cooperative bearer elements at each end of said master cylinder and respectively presenting recessed and projecting faces in contact with each other, one of said elements at each end being disposed in the housing of the end plate at said end, and the other of said elements being carried by said clamping member, to provide for endwise location of said clamping member in its clamping position.

4. In a duplicating machine of the kind specified, a master cylinder comprising a cylindrical shell having an axially extending slot, and structurally separate end plates assembled with said shell, said end plates incorporating housings having open radially presented ends, a master sheet clamping member slidable axially and depthwise of said slot and having a portion overlying a marginal portion of said shell bordering on said slot, biasing means urging said clamping member inwardly of said slot towards a clamping position, and means for expelling said clamping member outwardly of said shell in response to axial displacement of said clamping member comprising cam elements on said clamping member adjacent to each of its ends and presenting recessed faces of V-shape overlying said ends of said housings, and rotatable bearer elements loosely carried in each of said housings, and retained thereby by said clamping member, said bearer elements cooperating with said cam elements respectively, to provide for endwise location of said clamping member in its clamping position.

References Cited in the file of this patent

UNITED STATES PATENTS

| | | |
|---|---|---|
| 1,967,266 | Rowell | July 24, 1934 |
| 2,045,020 | Marchev | June 23, 1936 |
| 2,588,917 | Geib | Mar. 11, 1952 |